(12) United States Patent
Lindberg et al.

(10) Patent No.: US 12,206,348 B2
(45) Date of Patent: Jan. 21, 2025

(54) ELECTRIC MACHINE DRIVE ARRANGEMENT FOR A HEAVY-DUTY VEHICLE

(71) Applicant: Volvo Truck Corporation, Gothenburg (SE)

(72) Inventors: Johan Lindberg, Gothenburg (SE); Pranav Arya, Lindome (SE)

(73) Assignee: Volvo Truck Corporation, Gothenburg (SE)

( * ) Notice: Subject to any disclaimer, the term of this patent is extended or adjusted under 35 U.S.C. 154(b) by 234 days.

(21) Appl. No.: 18/097,726

(22) Filed: Jan. 17, 2023

(65) Prior Publication Data

US 2023/0253906 A1   Aug. 10, 2023

(30) Foreign Application Priority Data

Feb. 9, 2022   (EP) .................................... 22155904

(51) Int. Cl.
*H02P 27/06* (2006.01)
*B60L 7/06* (2006.01)
*H02K 7/10* (2006.01)

(52) U.S. Cl.
CPC ............... *H02P 27/06* (2013.01); *B60L 7/06* (2013.01); *H02K 7/10* (2013.01); *B60L 2200/40* (2013.01)

(58) Field of Classification Search
CPC .... B60L 2200/26; B60L 7/10; B60L 2200/36; B60L 2210/40; B60L 2200/40; B60L 50/51; B60L 50/60; B60L 7/26; B60L 7/18; B60L 2210/30; B60L 2240/529; B60L 2210/46; B60L 3/0046; B60L 58/10; B60L 7/08; B60L 2220/14; B60L 7/003; B62D 61/10; H02P 2201/03; H02P 2201/07; H02P 2201/09; H02P 2201/11; H02P 2201/13;

(Continued)

(56) References Cited

U.S. PATENT DOCUMENTS 5,892,342 A * 4/1999 Friedlander .............. H02H 7/06
                                                            318/434
2009/0066272 A1   3/2009 Jobard et al.

(Continued)

FOREIGN PATENT DOCUMENTS

CN    204623182 U    9/2015
CN    107623466 A    1/2018

(Continued)

OTHER PUBLICATIONS

Extended European Search Report for European Patent Application No. 22155904.0, mailed Jul. 25, 2022, 14 pages.

*Primary Examiner* — Antony M Paul
(74) *Attorney, Agent, or Firm* — Withrow & Terranova, PLLC

(57) ABSTRACT

An electric machine drive arrangement for a heavy-duty vehicle. The electric machine drive arrangement comprises a motor drive system inverter with an alternating current side for interfacing with an electric machine. The electric machine drive arrangement comprises a brake arrangement comprising a braking resistor circuit connectable to a control circuit. The electric machine drive arrangement comprises a rectifier arrangement connected in parallel between the brake arrangement and the motor drive system inverter on the alternating current side of the motor drive system inverter.

9 Claims, 5 Drawing Sheets

(58) Field of Classification Search
CPC ............ H02P 2201/15; H02P 2205/05; H02P 2207/00; H02P 2207/05; H02P 2207/055; H02P 2207/07; H02P 2207/073; H02P 2207/076; H02P 3/04; H02P 3/12; H02P 3/16; H02P 3/22; H02P 3/26; H02P 27/06; H02P 27/08; H02P 27/085; H02P 21/20; H02P 21/22; H02P 23/00; H02P 23/07; H02P 9/30; H02P 9/08

See application file for complete search history.

(56) References Cited

U.S. PATENT DOCUMENTS

| | | |
|---|---|---|
| 2009/0224705 A1 | 9/2009 | Jobard et al. |
| 2009/0224706 A1 | 9/2009 | Jobard |
| 2012/0121447 A1 | 5/2012 | Hayashi et al. |
| 2012/0146558 A1 | 6/2012 | Villhauer et al. |

FOREIGN PATENT DOCUMENTS

| | | |
|---|---|---|
| EP | 1162726 A1 | 12/2001 |
| JP | H01133583 A | 5/1989 |

\* cited by examiner

ELECTRIC MACHINE DRIVE ARRANGEMENT FOR A HEAVY-DUTY VEHICLE

RELATED APPLICATIONS

The present application claims priority to European Patent Application No. 22155904.0, filed on Feb. 9, 2022, and entitled "ELECTRIC MACHINE DRIVE ARRANGEMENT FOR A HEAVY-DUTY VEHICLE," which is incorporated herein by reference in its entirety.

TECHNICAL FIELD

Embodiments presented herein relate to an electric machine drive arrangement for a heavy-duty vehicle. Embodiments presented herein further relate to a vehicle comprising such an electric machine drive arrangement.

BACKGROUND

In general terms, resistors can be used to consume energy and dissipate that consumed energy in the form of heat. When any mechanical system decelerates, the system acts as a generator and creates large amounts of electrical energy which is transfer back into the power circuit. This large amount of energy is consumed by the resistor, which is present in a power circuit. The resistor converts the consume energy into heat and at the same instant braking effect is created. Hence, resistors used for this purpose are known as braking resistor and the process is commonly referred to as dynamic braking. Thus, the purpose of a braking resistor is to quickly stop or slow down the mechanical system by producing a braking torque. Braking resistors are designed with specifications such as resistance and average braking power. Braking resistors with smaller ohmic values help motors to stop faster and dissipate more heat. The braking resistors requires less service and provides higher reliability. Therefore, braking resistors are preferred over friction brakes to decelerate motors. Commonly, the electric braking resistor is connected in series with a chopper or with a circuit breaker on the direct current side of the electric motor drive system.

FIG. 1 shows an electric machine drive arrangement 100 according to an illustrative example. The electric machine drive arrangement 100 comprises an electric machine 110. The electric angular speed and the alternating current (as measured by an alternating current measurement unit 170) are, together with a direct current voltage ($U_{DC}$), provided as input to an electric machine controller 160. The electric machine controller 160 controls a switching pattern of six switches 122 as provided in a motor drive system inverter 120. A brake arrangement 130 comprises a braking resistor 132 connected in series with a direct current chopper 134 and/or a circuit breaker 136.

According to the electric machine drive arrangement 100, the brake arrangement 130, and thus the braking resistor 132, is provided in a parallel circuit to the motor drive system inverter 120 and an electric energy storage system 140 comprising a battery or another type of energy storage circuitry 142. This is a concern if the circuit breaker 136 does not open and/or the direct current chopper 134 does not stop conducting. The result of this could be that the energy storage 140 is drained through the braking resistor 132 in situations when the energy storage 140 is not to be used.

Additionally, the motor drive system inverter 120 in the electric motor drive arrangement 100 needs to be dimensioned for the maximum brake power. This is since the maximum brake power could be larger than allowed by the energy storage 140.

SUMMARY

An object of the embodiments disclosed herein is to address the issues noted above.

A particular object of the embodiments disclosed herein is to provide an electric machine drive arrangement addressing the above issues According to a first aspect, the object is achieved by an electric machine drive arrangement for a heavy-duty vehicle. The electric machine drive arrangement comprises a motor drive system inverter with an alternating current side for interfacing with an electric machine. The electric machine drive arrangement comprises a brake arrangement comprising a braking resistor circuit connectable to a control circuit. The electric machine drive arrangement comprises a rectifier arrangement connected in parallel between the brake arrangement and the motor drive system inverter on the alternating current side of the motor drive system inverter.

According to a second aspect, the object is achieved by a vehicle comprising an electric machine drive arrangement according to the first aspect.

Advantageously, by the provision of the disclosed electric machine drive arrangement, the issues disclosed above with respect to the electric machine drive arrangement 100 of FIG. 1 are overcome.

Advantageously, the motor drive system inverter does not need to be dimensioned for the brake power.

Advantageously, the disclosed electric machine drive arrangement allows for different types of control circuits.

According to an embodiment, the control circuit is a direct current chopper circuit. This is advantageous when brake power needs to be controlled dynamically and exceeds the power capability of the motor drive inverter.

According to an embodiment, the control circuit is a thyristor switch. This is advantageous when a low-cost solution with less controllability can be used and the electric machine does not possess any back Electric Motor Force, e.g. permanent magnet synchronous machine. The thyristor will continue conducting the current until the current crosses zero. Consequently, the machine voltages must be zero to stop the thyristor to conduct.

According to an embodiment, the motor drive system inverter is under-dimensioned with respect to the maximum brake power of the electric machine. Advantageously, this embodiment takes further advantage of the fact that the motor drive system inverter does not need to be dimensioned for the brake power. Hence, components with lower ratings than needed (with respect to the maximum brake power of the electric machine) could be used in the electric machine drive arrangement.

According to an embodiment, an alternating current measurement unit of the motor drive system inverter is arranged between the rectifier arrangement and the electric machine on the alternating current side of the rectifier arrangement. This current measurement is used to control the electric machine torque.

Further advantages and advantageous features of the inventive concept are disclosed in the following description and in the dependent claims.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

According to the herein disclosed embodiments there is provided an electric machine drive arrangement for a heavy-duty vehicle aimed at mitigating the above disclosed issues.

Figure 1:
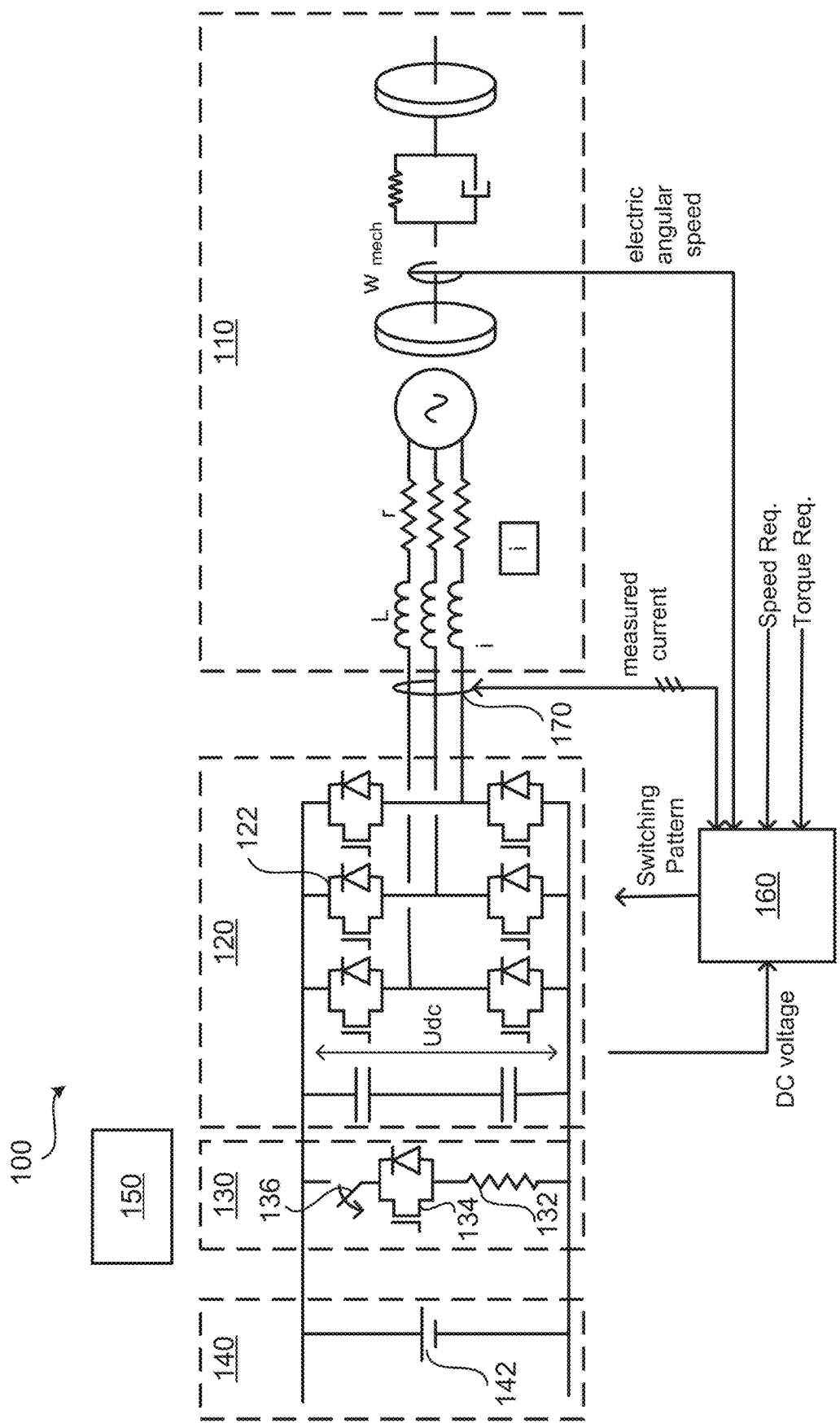
FIG. 1 is a schematic illustration of an electric machine drive arrangement according to prior art.
Figure 2:
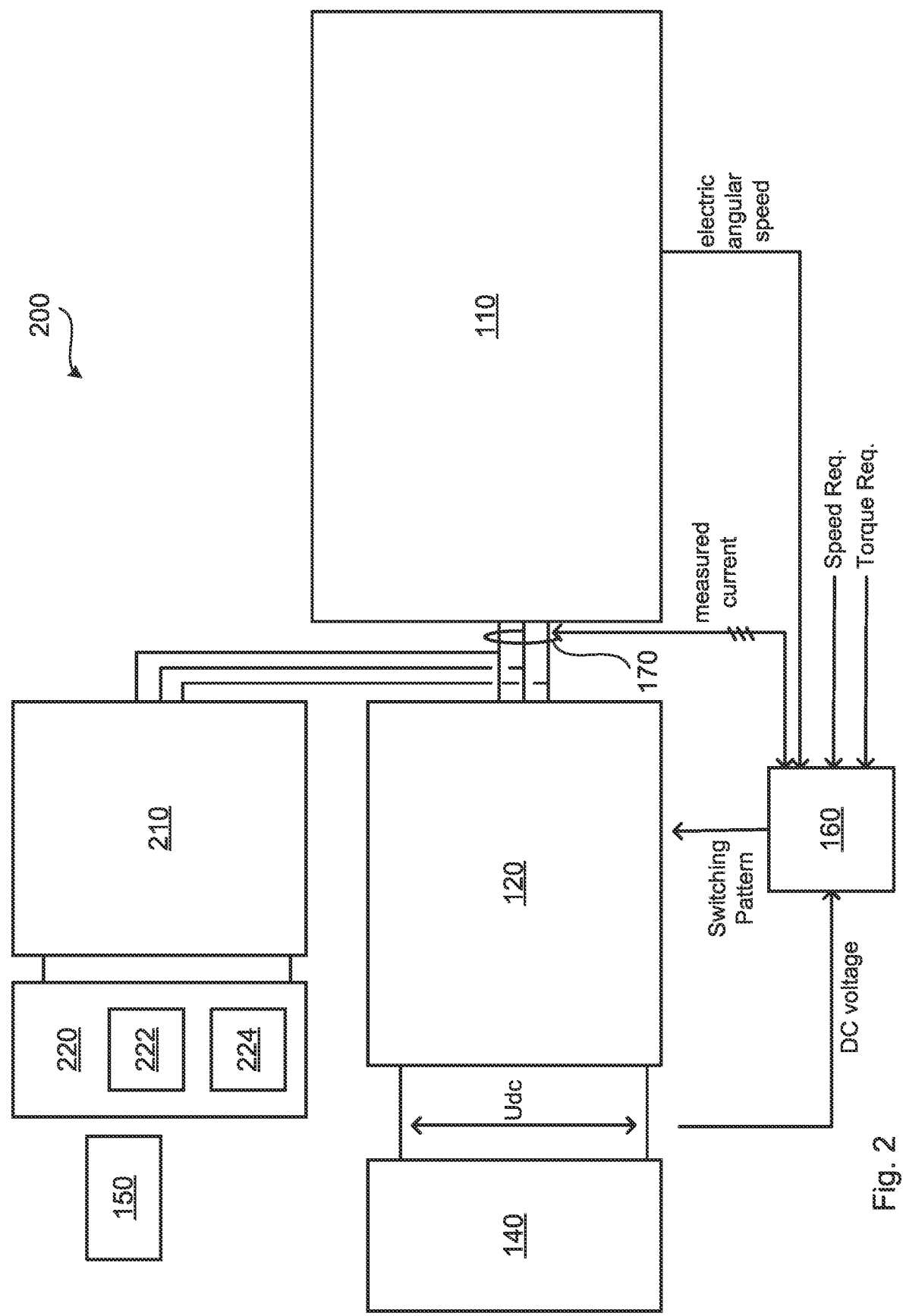
FIG. 2 is a schematic illustration of an electric machine drive arrangement according to a first embodiment.

FIG. 2 illustrates an electric machine drive arrangement 200 for a heavy-duty vehicle according to an embodiment.

The electric machine drive arrangement 200 comprises a motor drive system inverter 120. The alternating current side of the motor drive system inverter 120 is arranged for interfacing with an electric machine 110.

The electric machine drive arrangement 200 further comprises a brake arrangement 220. The brake arrangement 220 comprises a braking resistor circuit 222. The braking resistor circuit 222 is connectable to a control circuit 224.

The electric machine drive arrangement 200 further comprises a rectifier arrangement 210. The rectifier arrangement 210 is connected in parallel between the brake arrangement 220 and the motor drive system inverter 120 on the alternating current side of the motor drive system inverter 120.

By introducing such a rectifier arrangement 210 in parallel with the motor drive system inverter 120 on the alternating current side of the motor drive system inverter 120, and a braking resistor circuit 222 on the direct current side of the rectifier arrangement 210, the above noted safety issue is mitigated. Further, the motor drive system inverter 120 does not need to be dimensioned for the brake power. Hence, the electric machine 110 may be overloaded (based on thermal overload capability) without impact on the dimensioning of the motor drive system inverter 120. In particular, in some embodiments, the motor drive system inverter 120 is under-dimensioned with respect to a maximum brake power of the electric machine 110. This implies that the maximum (instantaneous) dissipation effect is smaller than that of the electric machine 110.

The electric angular speed and the alternating current (as measured by an alternating current measurement unit 170) are, together with a direct current voltage ($U_{DC}$), provided as input to an electric machine controller 160. The electric machine controller 160 controls a switching pattern of inverter switches (not shown in FIG. 2) provided in a motor drive system inverter 120.

An energy storage system 140 is provided in parallel to the motor drive system inverter 120. One purpose of the energy storage system 140 is to provide stable direct current voltage during switching. The energy storage system 140 is arranged to be further connected to one or more energy storage devices, such as batteries (not shown in figure).

A brake arrangement controller 150 is arranged to, in accordance with a duty cycle, control the switching pattern of the control circuit 224 (such as of a direct current chopper circuit and/or a thyristor switch provided in the control circuit 224). The duty cycle of the switching determines the amount of power that is dissipated in the braking resistor circuit 222.

By separating the braking resistor circuit 222 from the motor drive system inverter 120 and the energy storage system 140, the safety issues of having the braking resistor circuit 222 in parallel with the energy storage system 140 is mitigated. In addition, since the motor drive system inverter 120 does not be dimensioned for the brake power, this enables to short term overload the electric machine 110.

In some aspects, the motor drive system alternating current measurement is performed on the electric motor side of the rectifier arrangement 210. That is, in some embodiments, the electric machine drive arrangement 200 further comprises an alternating current measurement unit 170. The alternating current measurement unit 170 is arranged between the rectifier arrangement 210 and the electric machine 110 on the alternating current side of the rectifier arrangement 210. By that, the torque control (or current control) of the motor drive system will still control the torque (or current) even when the braking resistor circuit 222 is conducting. Hence, the braking resistor circuit power load will be regarded as a load disturbance compensated by the electric machine controller 160, maintaining the requested torque.

Figure 3:
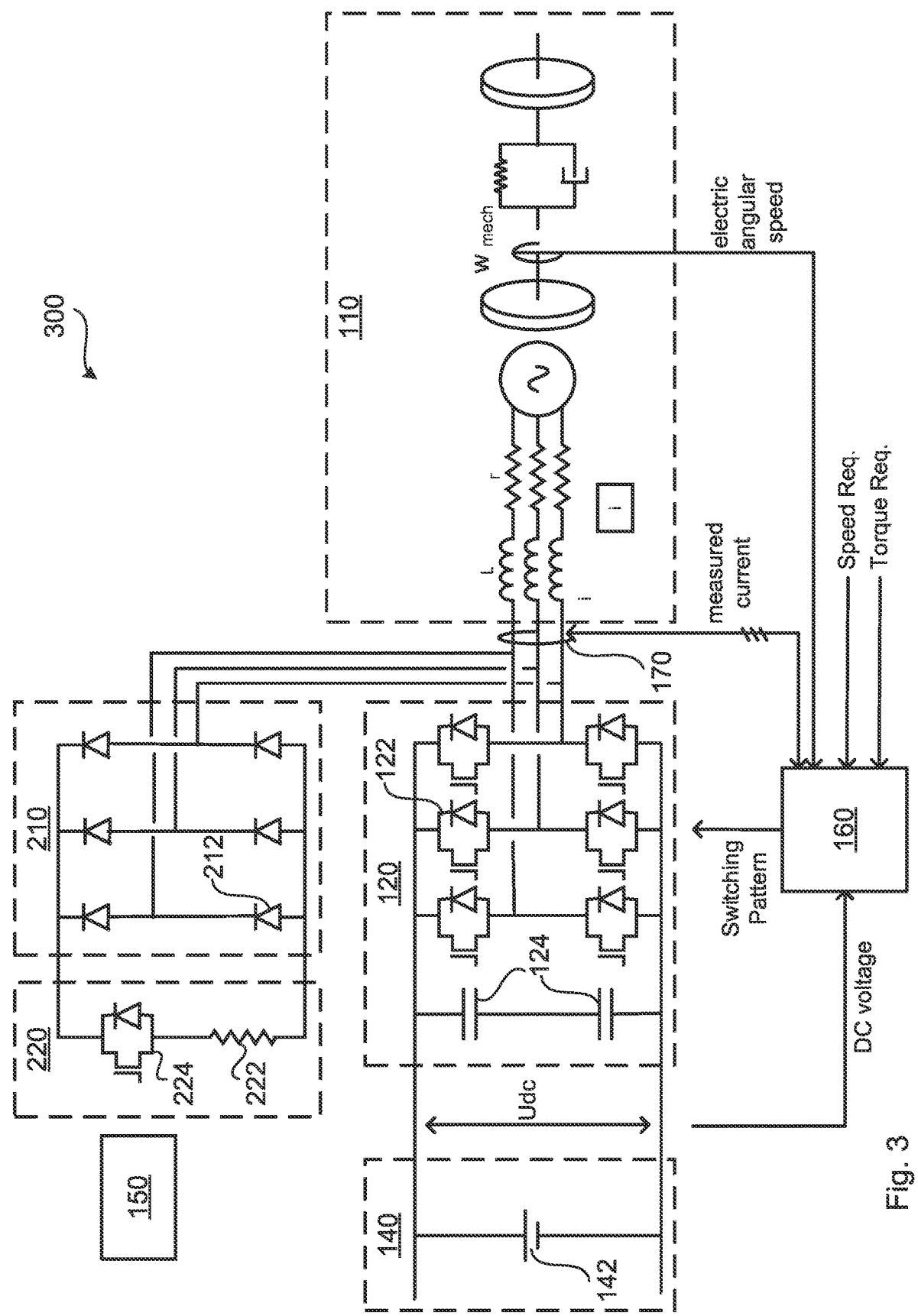
FIG. 3 is a schematic illustration of an electric machine drive arrangement according to a second embodiment.

Reference is next made to the electric machine drive arrangement 300 of FIG. 3. The electric machine drive arrangement 300 shows one illustrative realization of the electric machine drive arrangement 200.

In the realization exemplified by the electric machine drive arrangement 300, the rectifier arrangement 210 is a three-phase rectifier composed of diodes 212.

In the realization exemplified by the electric machine drive arrangement 300, the braking resistor circuit 222 is a braking resistor. However, in other realizations of the electric machine drive arrangement 200, the braking resistor circuit 222 is an electrical motor. The electrical motor is connectable to a mechanical brake circuit.

In the realization exemplified by the electric machine drive arrangement 300, the control circuit 224 is a direct current chopper circuit. However, in other realizations of the electric machine drive arrangement 200, the control circuit 224 is a thyristor switch. In further detail, when, for example, considering a motor drive arrangement 100 with an asynchronous electric machine 110, the direct current chopper can be exchanged with a thyristor switch. The Thyristor will stop conducting when the current is zero. This is achieved by setting the reactive current in the electric machine controller 160 to zero and by that the rotor magnetic field will go to zero and the induced voltage will go to zero and by that the current will be zero.

Further, in the realization exemplified by the electric machine drive arrangement 300, six switches 122 in addition to two capacitors 124 are provided in the motor drive system inverter 120.

In this respect, the motor drive system inverter 120 can be realized in several ways. herein FIG. 3 is illustrated a two-level voltage sources converter. However, the proposed electric machine drive arrangement is not limited to such a topology. The electric machine drive arrangement could be realized using any multi-level configuration and also two-phase and multi-phase electric machines 110 can be applied.

Further, in the realization exemplified by the electric machine drive arrangement 300, the energy storage system 140 is provided as a battery another type of energy storage circuitry 142.

Figure 4:
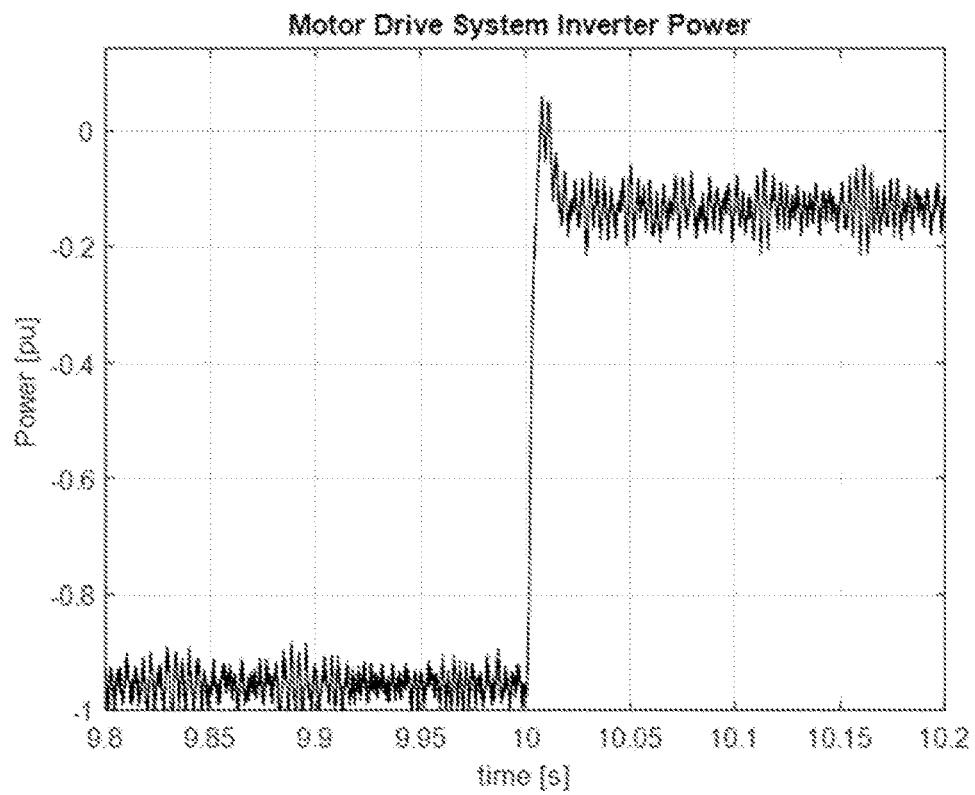
FIG. 4 shows changes in power as function of time according to an embodiment.
Figure 5:
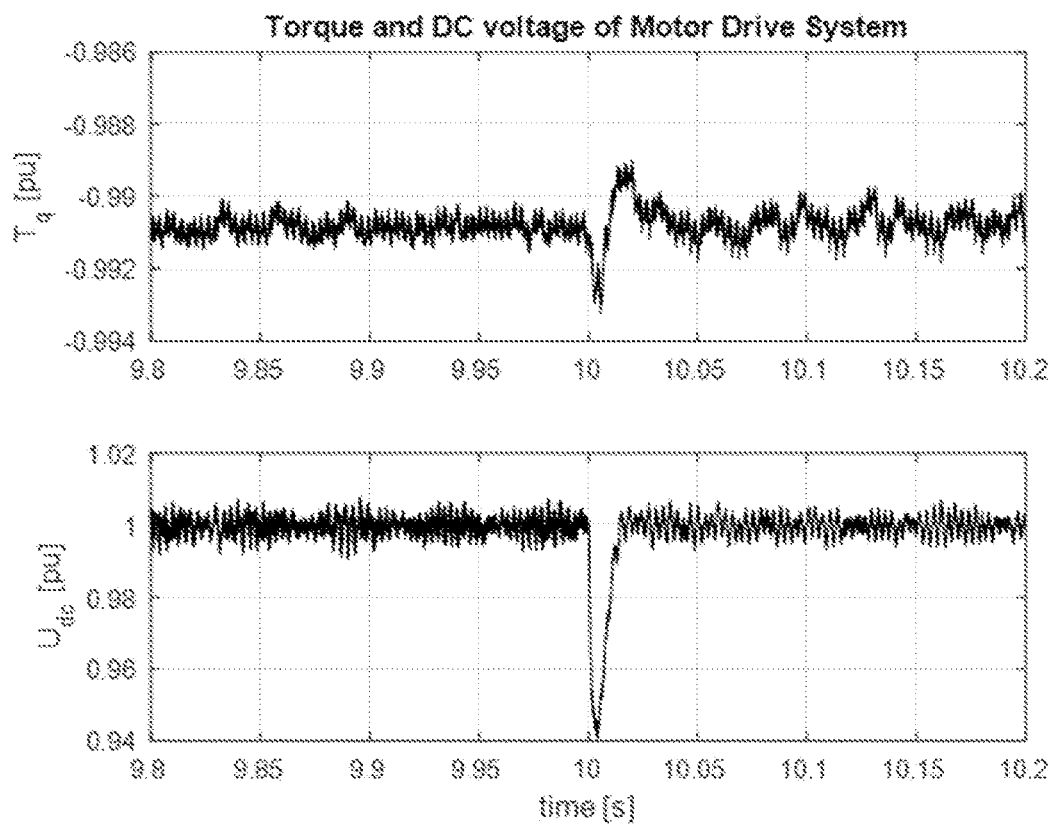
FIG. 5 shows changes in torque and direct current voltage as function of time according to an embodiment.

FIG. 4, and FIG. 5 provide examples of how the motor drive system inverter 120 power, the brake torque and direct current voltage of the motor drive system is affected when the power is shifted from the motor drive system inverter 120 to the brake arrangement 220. In FIG. 4 and in FIG. 5 the control circuit 224 is activated at 10 seconds. As can be seen, activating the control circuit 224 causes minor disturbance on the brake torque as well as on the direct current voltage of the energy storage system 140 at the direct current side of the motor drive system inverter 120. This minor disturbance is enabled by the herein disclosed electric machine drive arrangement 200, 300 and by performing current measurements at the electric machine 110.

Alternatives to having an electric machine drive arrangement 200, 300 with a brake arrangement 220 comprising a braking resistor circuit 222 connectable to a control circuit 224 and a rectifier arrangement 210 connected in parallel between the brake arrangement 220 and the motor drive system inverter 120 on the alternating current side of the motor drive system inverter 120 will disclosed next.

In a first alternative electric machine drive arrangement, alternating current choppers are provided on the alternating current side of the motor drive system inverter 120. One braking resistor per phase is then needed. In other words, the electric machine drive arrangement according to this first alternative is provided with separate choppers and braking resistors per phase. This requires all choppers and braking resistors to be coordinated in operation and also requires more components than the above disclosed electric machine drive arrangements 200, 300.

In a second alternative electric machine drive arrangement, a combination of circuit breakers and direct current choppers are provided in series on the direct current side of the motor drive system inverter 120. Also in this second alternative, the electric machine drive arrangement is provided with separate choppers and braking resistors per phase. This requires all choppers and braking resistors to be coordinated in operation and also requires more components than the above disclosed electric machine drive arrangements 200, 300.

Accordingly, for both the first alternative electric machine drive arrangement and the second alternative, the motor drive system inverter 120 does not need to be dimensioned for the brake power. That is, the motor drive system inverter 120 does not need to be dimensioned with respect to the maximum brake power of the electric machine 110.

In summary, the present inventive concept relates to an electric machine drive arrangement, where a rectifier arrangement 210 is configured in parallel with the motor drive system inverter 120 on the alternating current side of the motor drive system inverter 120 in the motor drive system, and where a brake arrangement 220 is arranged on the direct current side of the rectifier arrangement 210. In this way the electric machine 110 may be overloaded (based on thermal overload capability) without impact on the dimensioning of the motor drive system inverter 120. The motor drive system alternating current measurement is made on the electric motor side of the rectifier arrangement 210. In this way the torque control (current control) of the motor drive system will still control the torque (current) even when the brake reactor is conducting. Hence, the brake resistor power load will just be a load disturbance compensated by the motor drive system controller, maintaining the requested torque.

Figure 6:
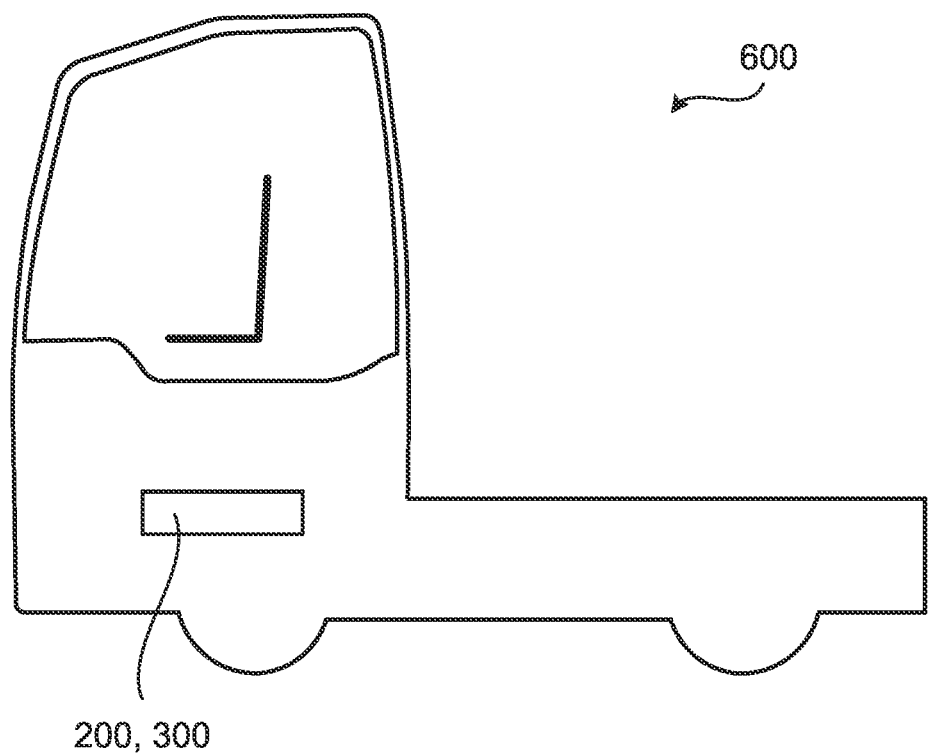
FIG. 6 is a schematic illustration of a vehicle according to an embodiment.

The herein disclosed electric machine drive arrangements 200, 300 are suitable for use in a vehicle 600, such as a heavy-duty vehicle. The vehicle 600 might, by means of the electric machine 110, be provided with electric traction. FIG. 6 schematically illustrates a vehicle 600 comprising an electric machine drive arrangement 200, 300 as herein disclosed. In some embodiments, the vehicle 600 is a heavy-duty vehicle. In this respect, the present inventive concept is applicable to different types of heavy-duty vehicles 600, such as, but not limited to, trucks, buses and construction equipment.

It is to be understood that the present inventive concept is not limited to the embodiments described above and illustrated in the drawings; rather, the skilled person will recognize that many changes and modifications may be made within the scope of the appended claims.

The invention claimed is:

1. An electric machine drive arrangement for a heavy-duty vehicle, comprising:
   a motor drive system inverter with an alternating current side for interfacing with an electric machine;
   a brake arrangement comprising a braking resistor circuit connectable to a control circuit; and
   a rectifier arrangement connected in parallel between the brake arrangement and the motor drive system inverter on the alternating current side of the motor drive system inverter.

2. The electric machine drive arrangement of claim 1, wherein the braking resistor circuit is a braking resistor.

3. The electric machine drive arrangement of claim 1, wherein the braking resistor circuit is an electrical motor connectable to a mechanical brake circuit.

4. The electric machine drive arrangement of claim 1, wherein the control circuit is a direct current chopper circuit.

5. The electric machine drive arrangement of claim 1, wherein the control circuit is a thyristor switch.

6. The electric machine drive arrangement of claim 1, wherein the motor drive system inverter is under-dimensioned with respect to a maximum brake power of the electric machine.

7. The electric machine drive arrangement of claim 1, wherein an alternating current measurement unit of the motor drive system inverter is arranged between the rectifier arrangement and the electric machine on the alternating current side of the rectifier arrangement.

8. A vehicle comprising the electric machine drive arrangement of claim 1.

9. The vehicle of claim 8, wherein the vehicle is a heavy-duty vehicle.

\* \* \* \* \*